July 10, 1934.  C. W. HOWARD  1,965,593
MANIPULATION AND SUPPORT OF AIRCRAFT MAPS
Filed May 15, 1933    2 Sheets-Sheet 2
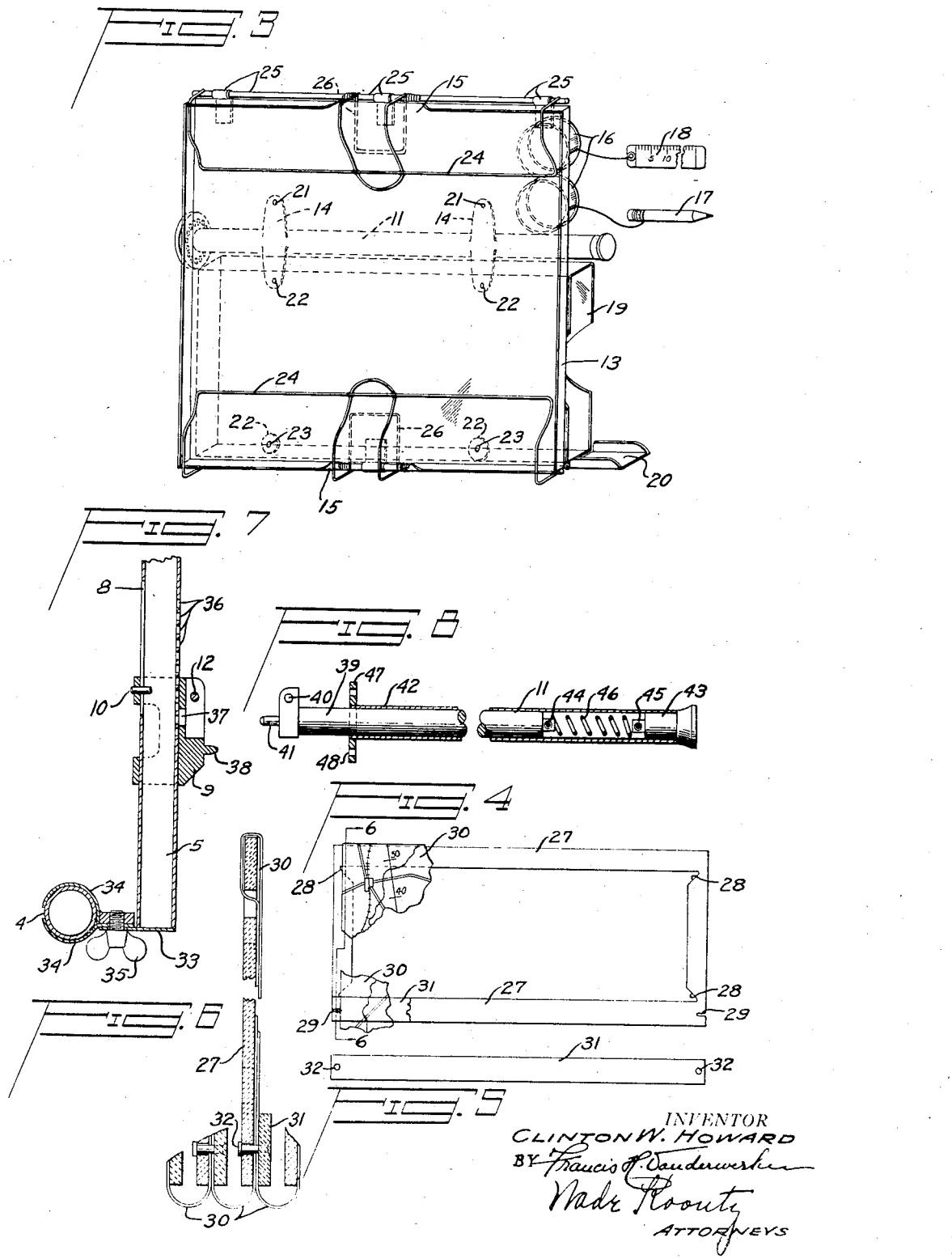

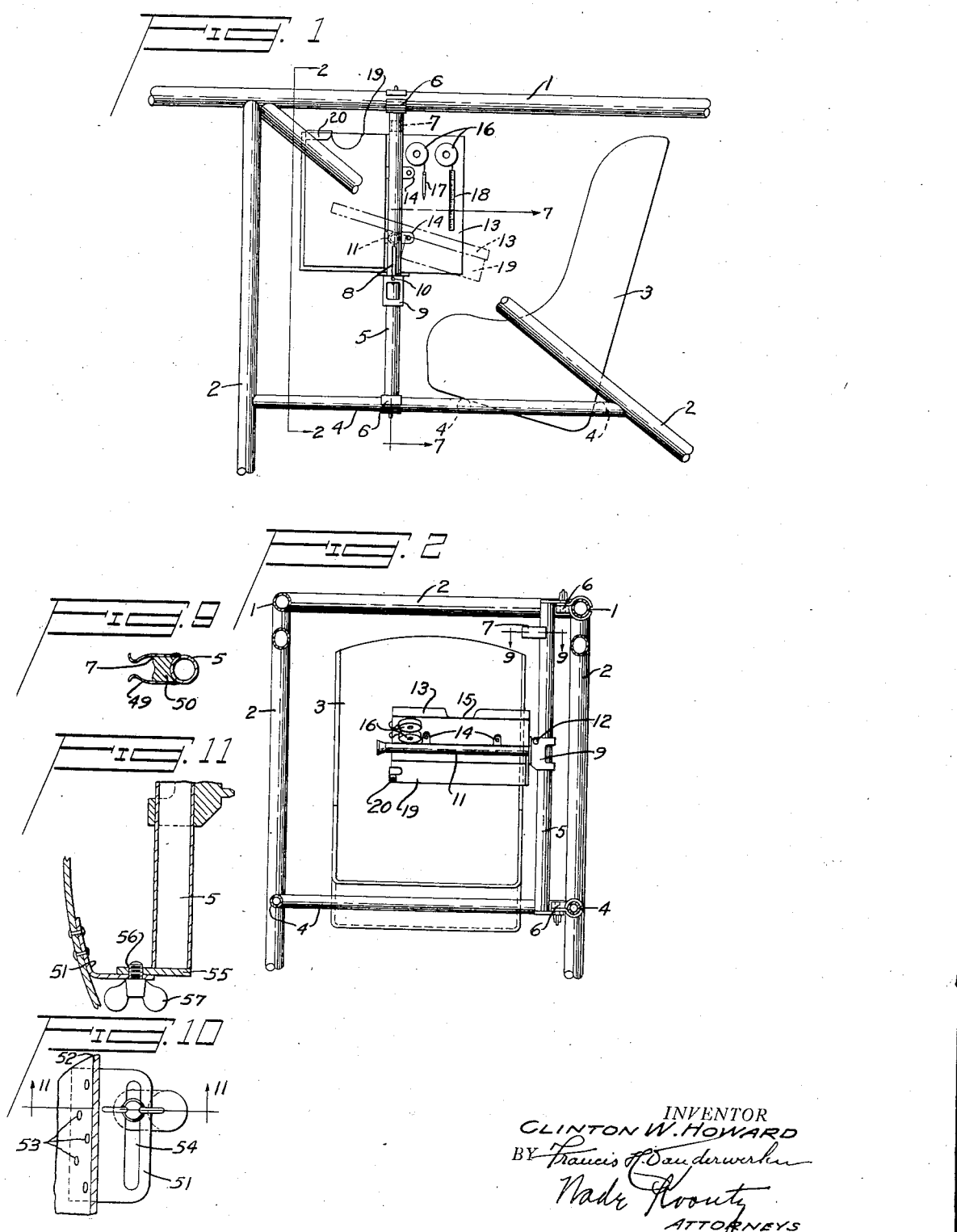

Patented July 10, 1934

1,965,593

UNITED STATES PATENT OFFICE 1,965,593

MANIPULATION AND SUPPORT OF AIRCRAFT MAPS

Clinton W. Howard, Dayton, Ohio

Application May 15, 1933, Serial No. 671,185

21 Claims. (Cl. 40—10)

(Granted under the act of March 3, 1883, as
amended April 30, 1928; 370 O. G. 757)

The invention described herein may be manufactured and used by or for the Government for governmental purposes, without the payment to me of any royalty thereon.

The present invention relates to improvements in the manipulation and support of aircraft maps during flight.

It is an object of this invention to provide means whereby an aircraft map may be readily grasped by gloved hands during flight.

It is another object of the invention to so arrange the map that any portion thereof may be readily exposed to view upon a support of compact dimensions or that it may be placed within a storage compartment of corresponding size.

A further object of the invention is to provide a map support which may be readily moved from an out of the way position against the side of a pilot's cockpit to a position immediately in front of said pilot.

It is a still further object of the invention to provide a map support readily adjustable as to height above a pilot's knees, readily tiltable in relation to the pilot's forearms and rotatable about a vertical hinge located against the side of the pilot's cockpit.

With the foregoing and other objects in view, which will appear as the description proceeds, the invention consists in improvements in the manipulation and support of aircraft maps during flight which will be hereinafter more fully illustrated and described in the accompanying drawings, and more particularly pointed out in the appended claims.

Reference is made to the drawings wherein numerals of like character designate similar parts throughout the several views.

In the drawings:

Fig. 1 shows a map support folded against the side of an aircraft fuselage.

Fig. 2 is a cross sectional view taken on the line 2—2 of Fig. 1, showing the map support positioned in front of the pilot's seat.

Fig. 3 is a top view of the platform portion of the map support slightly tilted from the plan position.

Fig. 4 is a plan view of a map frame with two broken portions of the map secured thereto.

Fig. 5 is a plan view of a map frame clamp.

Fig. 6 is an enlarged cross sectional view taken on the line 6—6 of Fig. 4.

Fig. 7 is a cross sectional view taken on the line 7—7 of Fig. 1.

Fig. 8 is a partial cross sectional view of a horizontal member fixedly attached to the platform portion of the map support.

Fig. 9 is a cross sectional view taken on the line 9—9 of Fig. 2.

Fig. 10 is a plan view of the installation of a vertical member adapted to support the horizontal member of Fig. 8 in a monocoque fuselage.

Fig. 11 is a cross sectional view taken on the line 11—11 of Fig. 10.

In Figs. 1 and 2, longérons 1 are shown fixedly attached to the fuselage brace tubes 2 to form the upper portion of a pilot's cockpit. A seat 3 is fixedly attached to the brace tubes 4, which in turn are fixedly attached to the fuselage brace tubes 2. A vertical tube 5 is slidably and pivotally secured at its upper extremity to the longéron 1 and at its lower extremity to the brace tube 4 by means of the adjustable clamps 6. The vertical tube 5 is provided at its upper extremity with a spring clip 7 and at its mid-portion with a longitudinal slot 8. There is mounted upon the vertical tube 5 a slidable bracket 9. Longitudinal movement of the bracket 9 is limited by engagement of an inwardly projecting pin 10, fixedly attached thereto, with the longitudinal slot 8. A horizontal member 11 is pivotally secured to the slidable bracket 9 by means of a hinge pin 12. In Fig. 2 the horizontal member 11 is shown extending outwardly from the side of the pilot's cockpit. In Fig. 1 the horizontal member 11 has been rotated upwardly until the end portion of the member 11 has engaged the spring clip 7. A tray 13 is fixedly attached to the horizontal member 11 by means of brackets 14. The tray 13 is provided with two oppositely disposed cutouts 15. There are fixedly attached to the tray 13 spring spools 16 provided with the usual retractable cords. To these cords are fixedly secured a pencil 17 and a scale 18. There is also fixedly attached to the tray 13 a storage compartment 19 provided with a hinged cover 20.

Fig. 3 shows an enlargement of the tray 13 and in detail the manner of fixedly securing the brackets 14 to the tray 13 by means of rivets 21 and further securing the storage compartment 19 to the brackets 14 and the tray 13 by means of rivets 22. Additional fixity of compartment 19 to the tray 13 is obtained by means of rivets 22 and washers 23. Flexible clamps 24 are pivotally secured to the top and bottom portions of the tray 13 by means of the hinge 25. Coiled springs 26, fixedly secured to the pin portion of the hinge 25, hold the inward portions of the flexible clamp 24 against the bottom portion of the tray 13.

In Fig. 4, a frame 27 is provided with indentures 28 and slots 29. An inverted and broken away portion of an aircraft map 30 has been inserted downwardly through the indenture 28 brought forwardly beyond the top portion of the frame 27 and then folded back in the manner shown in Fig. 4. By means of the above operation both bottom and top portions of a complete aircraft map are extended downwardly, over and beyond the top surface of the frame 27.

Fig. 5 discloses a clamp 31, provided at its outer extremities with locking pins 32.

Returning to Fig. 4, it is essential that both the frame 27 and the clamp 31 be constructed of flexible material in order that, having secured the aircraft map 30 to the frame 27 in the manner hereinabove described, one of the locking pins 32 may be inserted in one of the slots 29, the clamp 31 extended across the bottom portion of the frame 27 and the latter portion so sprung in relation to the clamp 31 that the remaining locking pin 32 may be engaged with the remaining slot 29.

In Fig. 6, the frame 27, clamp 31 and aircraft map 30 are shown in enlarged cross section to more fully disclose the manner of securing the aircraft map 30 to the frame 27. In addition to flexibility, it is also desirable that the frame 27 and the clamp 31 be made of transparent material in order that all the folded portions of the aircraft map 30 may be clearly exposed to view. It will be noted that the aircraft map 30 may be successively inserted through and secured to any desired multiples of the frame 27 so that a compact assembly similar to the bound leaves of a book is obtained.

In Fig. 7, there is fixedly secured to the lower extremity of the vertical tube 5 an end plate 33. The end plate 33 is pivotally secured to the upper and lower jaws of a clamp 34 by means of a wing bolt 35. Loosening of the wing bolt 35 permits fore and aft adjustment of the vertical tube 5 with respect to the brace tube 4 or pivotation of the vertical tube 5 about the longitudinal axis of the wing bolt 35. A duplicate arrangement of parts at the upper extremity of the vertical tube 5 permits fore and aft adjustment of the vertical tube 5 with respect to the longéron 1, as well as the pivotation set forth hereinabove. Engagement of the inwardly projecting pin 10 with the longitudinal slot 8 is also clearly shown. It will be noted that a plurality of horizontally spaced apertures 36 are disposed opposite to the longitudinal slot 8. The slidable bracket 9 is provided with an opening 37 and an outwardly projecting pin 38.

The horizontal member 11, shown in Fig. 8, is composed of a horizontal rod 39 adapted to be pivotally secured to the slidable bracket 9 by means of the pin hole 40 and hinge pin 12. The hinged extremity of the horizontal rod 39 is further provided with an outwardly projecting pin 41 adapted to pass through the opening 37 and engage any one of the apertures 36 in the vertical tube 5. The rod 39 is telescoped into a horizontal tube 42. A removable handle 43 is also telescoped within the horizontal tube 42. The inner extremities of the rod 39 and handle 43 are provided with apertures 44 and 45 adapted to receive and secure the outer extremities of a tension spring 46. A disc 47 is fixedly secured to the hinged extremity of the horizontal tube 42. Apertures 48 are provided at the periphery of the disc 47.

In Fig. 9, the spring leaves 49 and filler 50 of the spring clip 7 are shown fixedly attached to the upper extremity of the vertical tube 5.

In Fig. 10, a bracket 51 is fixedly secured to the skin 52 of a monocoque fuselage by means of rivets 53. The bracket 51 is provided with a longitudinal slot 54.

In Fig. 11, an end plate 55 is fixedly secured to the lower extremity of the vertical tube 5 and provided with a threaded hole 56. The end plate 55 is pivotally secured to the bracket 51 by means of the wing bolt 57 inserted in the threaded hole 56. Through a similar arrangement of parts at the upper extremity of the vertical tube 5, fore and aft adjustment of the vertical tube 5 with respect to the longitudinal axis of the aforementioned monocoque fuselage, as well as rotation of the vertical tube 5 about the longitudinal axis of the wing bolts 57, is obtained.

The operation of the invention is as follows:

The aircraft map is first secured to a plurality of map frames 27, as set forth hereinabove, deposited in the compartment 19, after which the platform portion of the map support is secured against the side of the pilot's cockpit, in the manner shown in Fig. 1. Following take-off from the airdrome, the pilot grasps the top of the platform portion of the map support, frees the same from the spring clip 7, rotates the tray 13 uppermost, thus permitting the whole to take a position substantially that shown in Fig. 2. The aircraft map 30 is next removed from the compartment 19, unfolded to that portion of the map over which the airplane is flying, after which the map is secured to the tray 13 by means of the flexible clamps 24. It is likely, following initial adjustment, that the pilot will find the aircraft map 30 inconveniently located with respect to distance from his seat, unsatisfactory as to tilted adjustment with reference to his forearms or improperly elevated with respect to his knees. The manner in which various repositioning of the aircraft map 30 is accomplished is discussed below.

Referring to Figs. 7 and 8, let it be assumed that the aircraft map 30 is improperly tilted with reference to the pilot's forearms. The pilot grasps the handle 43 or outward portion of the tray 13 with his right hand and moves the same to the right. The apertures 48 being freed from the pin 38, the tray 13 may be inclined at any desired angle, following which release of the handle 43 relocks the tray 13 in that position.

During the aforementioned adjustment, the horizontal member 11 remained in a horizontal position similar to that shown in Fig. 2. In the event the pilot desires to elevate or depress the tray 13, the horizontal member 11 is rotated upwardly about the hinge pin 12, causing disengagement of the pin 41 from that aperture 36 with which it was previously engaged. Slidable adjustment to any desired height of the bracket 9 above the pilot's knees may then be accomplished. Return of the horizontal member 11 to a position similar to that shown in Fig. 2 will cause re-entry of the pin 41 into an aperture 36 opposite thereto and relocking of the tray 13 against vertical movement.

While it is anticipated that the two adjustments referred to hereinabove will suffice, it is also possible for the pilot to adjust the map support in a fore and aft direction, by loosening the wing bolts 35, or by semi-tightening of the same, to swing the platform portion of the map support in a fore and aft direction about the longitudinal axes of the wing bolts 35 located against the side of the pilot's cockpit.

As the airplane continues its flight, progressive exposures of the folded aircraft map 30 are required. These exposures are accomplished by raising the spring clamp 24 from that "leaf" of the aircraft map 30 which it is desired to turn over and re-securing the same beneath the spring clamp 24 immediately opposite thereto. Through the above operation, a new portion of the aircraft map 30 is exposed to view. The aforementioned operation is repeated, as the flight of the airplane continues. While aircraft maps are generally quite complete in their markings as to specified courses of travel, it is often necessary for a pilot to plot supplemental courses upon the map. For this reason the scale 18 and the pencil 17 are provided for emergency layout of such courses.

I claim:

1. A map supporting device adapted for use in an aircraft cockpit comprising in combination, a map, a plurality of frames including removable clamps for folding and holding said map taut, an adjustable platform for holding said map and folding means, and means for djustably supporting said map platform.

2. A map supporting device adapted for use in an aircraft cockpit comprising in combination, a map, a plurality of frames provided with indentures adapted to engage the sides of said map and removable clamps adapted to secure the sides and body portion of said map for folding and holding portions of said map taut, an adjustable platform for holding said map and folding means, and means for adjustably supporting said map platform.

3. A map supporting device adapted for use in an aircraft cockpit comprising in combination, a map, a plurality of frames provided at the upper inner portions of their sides with indentures and at the lower outer portions of their sides with slots, a plurality of elongated members provided at their end portions with pins adapted to slidably engage the slots in the lower outer portions of said frames, said map, said frames and said elongated members being constructed and arranged such that desired portions of said map may be progressively folded and secured taut to said frames thus permitting ready access to said map portion by folding or unfolding said frames, an adjustable platform for holding said map and folding means, and means for adjustably supporting said map platform.

4. A map supporting device adapted for use in an aircraft cockpit comprising in combination, the map, frames, elongated members, adjustable platform and platform supporting means set forth in claim 3, said frames and said elongated members being constructed of a flexible transparent material and arranged such that unobstructed vision of desired portions of said map is obtained as said portions are progressively unfolded.

5. A map supporting device adapted for use in an aircraft cockpit comprising in combination, a map, folding means for holding portions of said map taut, an adjustable platform comprising a tray portion and a storage compartment for holding said map and folding means, and means for adjustably supporting said tray and storage portions readily accessible to the vision and manipulation of a cockpit occupant.

6. A map supporting device adapted for use in an aircraft cockpit comprising in combination, a map, folding means for holding portions of said map taut, an adjustable platform comprising a tray portion having flexible clamps and a storage compartment for holding said map and folding means, and means for adjustably supporting said tray and storage portions readily accessible to the vision and manipulation of a cockpit occupant.

7. A map supporting device adapted for use in an aircraft cockpit comprising in combination, a map, folding means for holding portions of said map taut, an adjustable platform comprising a tray portion having cut-outs and flexible clamps and a storage compartment, the whole constructed and arranged such that said map and folding means may be readily mounted, folded, dismounted and stored, and means for adjustably supporting said tray and storage portions readily accessible to the vision and manipulation of a cockpit occupant.

8. In a map supporting device adapted for use in an aircraft cockpit, a supporting means constructed and arranged such that the map, folding means, and adjustable platform set forth in claim 7 may be adjustably locked against a side of said cockpit out of the way of yet readily accessible to an occupant thereof.

9. In a map supporting device adapted for use in an aircraft cockpit, a supporting means constructed and arranged such that the map, folding means, and adjustable platform set forth in claim 7 may be adjustably locked in positions readily accessible to the vision and manipulation of an occupant of said cockpit.

10. In a map supporting device adapted for use in an aircraft cockpit, a supporting means constructed and arranged such that the map, folding means, and adjustable platform set forth in claim 7 may be adjusted to and locked in a series of vertical positions immediately before and accessible to an occupant of said ocockpit.

11. In a map supporting device adapted for use in an aircraft cockpit, a supporting means constructed and arranged such that the map, folding means, and adjustable platform set forth in claim 7 may be tilted to and locked in a series of fore and aft positions immediately before and accessible to an occupant of said cockpit.

12. In a map supporting device adapted for use in an aircraft cockpit, a supporting means constructed and arranged such that the map, folding means, and adjustable platform set forth in claim 7 may be pivoted about a vertical axis of rotation located against a side of said cockpit.

13. In a map supporting device adapted for use in an aircraft cockpit, a supporting means for the map, folding means, and adjustable platform set forth in claim 7, comprising, a vertical member secured to a side of said cockpit, a bracket mounted on said vertical member, and a horizontal member attached to said bracket and to said adjustable platform.

14. In a map supporting device adapted for use in an aircraft cockpit, a supporting means for the map, folding means, and adjustable platform set forth in claim 7, comprising a vertical member slidably secured in a fore and aft direction to a side of said cockpit, a bracket mounted on said vertical member, and a horizontal member attached to said bracket and to said adjustable platform.

15. In a map supporting device adapted for use in an aircraft cockpit, a supporting means for the map, folding means, and adjustable platform set forth in claim 7, comprising a vertical member slidably secured in a fore and aft direction and pivotally secured in a vertical direction to a side of said cockpit, a bracket mounted on said vertical member, and a horizontal member pivotally secured in a horizontal direction to said bracket and fixedly secured to said adjustable platform.

16. In a map supporting device adapted for use in an aircraft cockpit, a supporting means for the map, folding means, and adjustable platform set forth in claim 7, comprising a vertical member slidably secured in a fore and aft direction and pivotally secured in a vertical direction to a side of said cockpit, a bracket slidably mounted upon said vertical member and a horizontal member pivotally secured in a horizontal direction to said bracket and fixedly secured to said adjustable platform.

17. In a map supporting device adapted for use in an aircraft cockpit, a supporting means for the map, folding means, and adjustable platform set forth in claim 7, comprising a vertical tube having a longitudinal slot and being slidably secured in a fore and aft direction and pivotally secured in a vertical direction and pivotally secured in a vertical direction to a side of said cockpit, a bracket having an inward projection adapted to slidingly engage said longitudinal slot, said bracket being adapted to slide longitudinally upon said vertical tube within the limits of engagement of said inward projection with the top and bottom extremities of said longitudinal slot, and a horizontal member pivotally secured in a horizontal direction to said bracket and fixedly secured to said adjustable platform.

18. In a map supporting device adapted for use in an aircraft cockpit, a supporting means for the map, folding means, and adjustable platform set forth in claim 7, comprising a vertical tube having a longitudinal slot and being slidably secured in a fore and aft direction and pivotally secured in a vertical direction to a side of said cockpit, a bracket slidably mounted on said vertical tube and provided upon the one side with an inward projection adapted to engage said longitudinal slot and upon the other side with a horizontal hinge pin, a horizontal rod pivotally secured to said slidable bracket by means of said horizontal hinge pin and a horizontal tube slidably and rotatably mounted upon said horizontal rod and fixedly secured to said adjustable platform.

19. In a map supporting device adapted for use in an aircraft cockpit, a supporting means for the map, folding means, and adjustable platform set forth in claim 7, comprising a vertical tube having a plurality of longitudinally spaced apertures on the one side and a single longitudinal slot disposed opposite thereto, said vertical tube being slidably secured in a fore and aft direction and pivotally secured in a vertical direction to a side of said cockpit, a bracket slidably mounted on said vertical tube and provided upon the one side with an inward projection adapted to engage said longitudinal slot and upon the other side with a horizontal hinge pin, a horizontal rod pivotally secured to said bracket by means of said horizontal hinge pin and provided at its pivoted extremity with an outward projection adapted to engage any one of said longitudinally spaced apertures for securing said bracket against movement with reference to said vertical tube and at its other extremity with an aperture adapted to engage a spring end, and a horizontal tube slidably and rotatably mounted upon said horizontal rod and fixedly secured to said adjustable platform.

20. In a map supporting device adapted for use in an aircraft cockpit, a supporting means for the map, folding means, and adjustable platform set forth in claim 7, comprising a vertical tube having a plurality of longitudinally spaced apertures on the one side and a single longitudinal slot disposed opposite thereto, said vertical tube being slidably secured in a fore and aft direction and pivotally secured in a vertical direction to a side of said cockpit, a bracket slidably mounted on said vertical tube and provided upon the one side with an inward projection adapted to engage said longitudinal slot and upon the other side with a horizontal hinge pin, a horizontal rod pivotally secured to said bracket by means of said horizontal hinge pin and provided at its pivoted extremity with an outward projection adapted to engage any one of said longitudinally spaced apertures for securing said bracket against movement with reference to said vertical tube and at its other extremity with an aperture adapted to engage a spring end, a horizontal tube terminating in a fixed disc at one extremity and having a removable handle partially telescoped within the other extremity, said tube and disc being fixedly secured to said adjustable platform and slidably and rotatably mounted upon said horizontal rod, and a tension spring adapted to be readily attached to an aperture provided in the telescoped extremity of said removable handle and to the spring attaching aperture provided in said horizontal rod.

21. In a map supporting device adapted for use in an aircraft cockpit, a supporting means for the map, folding means, and adjustable platform set forth in claim 7, comprising a vertical tube having a plurality of longitudinally spaced apertures on the one side and a single longitudinal slot disposed opposite thereto, said vertical tube being slidably secured in a fore and aft direction and pivotally secured in a vertical direction to a side of said cockpit, a bracket slidably mounted on said vertical tube and provided upon the one side with an inward projection adapted to engage said longitudinal slot and upon the other side with a horizontal hinge pin and an outward projection therebeneath, a horizontal rod pivotally secured to said bracket by means of said horizontal hinge pin and provided at its pivoted extremity with an outward projection adapted to engage any one of said longitudinally spaced apertures for securing said bracket against movement with reference to said vertical tube and at its other extremity with an aperture adapted to engage a spring end, a horizontal tube terminating at one extremity in a fixed disc having peripheral apertures adapted to separately engage said outward bracket projection and having a removable handle telescoped within the other extremity said tube and disc being fixedly secured to said adjustable platform and slidably and rotatably mounted upon said horizontal rod, and a tension spring telescoped within said horizontal tubing and adapted for securing said peripheral apertures in successive yieldable engagement with said outward bracket projection when said horizontal rod is positioned normal to said vertical tube.

CLINTON W. HOWARD.